(12) United States Patent
Martin et al.

(10) Patent No.: US 8,056,079 B1
(45) Date of Patent: Nov. 8, 2011

(54) ADDING TASKS TO QUEUED OR RUNNING DYNAMIC JOBS

(75) Inventors: Jos Martin, Burwell (GB); Arjav Chakravarti, Natick, MA (US)

(73) Assignee: The MathWorks, Inc., Natick, MA (US)

( * ) Notice: Subject to any disclaimer, the term of this patent is extended or adjusted under 35 U.S.C. 154(b) by 1349 days.

(21) Appl. No.: 11/317,385

(22) Filed: Dec. 22, 2005

(51) Int. Cl.
*G06F 9/46* (2006.01)
*G06F 15/16* (2006.01)
*G06F 15/173* (2006.01)

(52) U.S. Cl. ........ 718/102; 718/100; 718/101; 718/103; 718/107; 709/201; 709/203; 709/205; 709/226

(58) Field of Classification Search .................. 718/100, 718/101, 102, 104, 107; 705/8; 709/201, 709/203, 205, 226
See application file for complete search history.

(56) References Cited

U.S. PATENT DOCUMENTS

| | | | |
|---|---|---|---|
| 7,454,659 B1 * | 11/2008 | Gaudette et al. | 714/33 |
| 7,555,440 B2 * | 6/2009 | Ingman | 705/8 |
| 2003/0212542 A1 * | 11/2003 | Lee et al. | 704/7 |
| 2004/0015968 A1 * | 1/2004 | Neiman et al. | 718/100 |
| 2005/0021594 A1 * | 1/2005 | Bernardin et al. | 709/200 |
| 2006/0075408 A1 * | 4/2006 | Powers et al. | 718/100 |

OTHER PUBLICATIONS

Chen et al., "MATLAB*G: A Grid-Based Parallel MATLAB", Department of Computer Science, National University of Singapore, 2002, pp. 1-6.*

* cited by examiner

*Primary Examiner* — Kenneth Tang
(74) *Attorney, Agent, or Firm* — Nelson Mullins Riley & Scarborough LLP

(57) ABSTRACT

The present invention provides a method and system wherein additional tasks can be added to a dynamic job after the job has been submitted to a scheduler. The added task can then be given the same priority as the tasks of the previously submitted dynamic job it is being added to. That is, the task added to the dynamic job is given priority over tasks and jobs submitted after the dynamic job the task is being added to. In one embodiment, a method is provided for distributing the processing of tasks in a distributed technical computing environment. The method involves the steps of creating tasks at a client, packaging the tasks into a dynamic job, and forwarding the dynamic job to a scheduler for distribution to a plurality of workers in the distributed technical computing environment. An additional task can then be created and added to the previously submitted dynamic job.

31 Claims, 9 Drawing Sheets

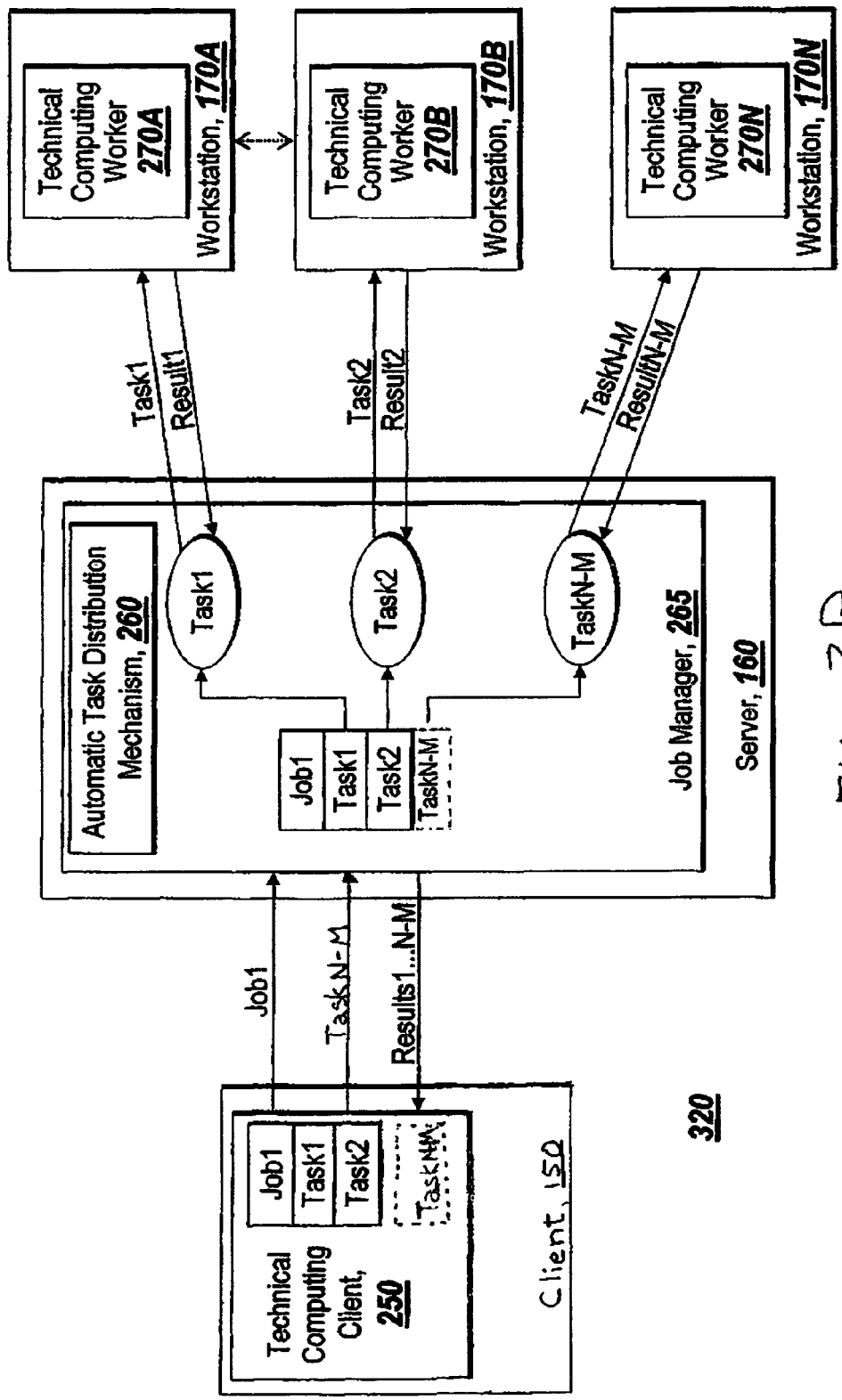

ADDING TASKS TO QUEUED OR RUNNING DYNAMIC JOBS

TECHNICAL FIELD

The present invention generally relates to technical computing, and more particularly to distributing technical computing processing to multiple computers in a network in a distributed technical computing environment.

BACKGROUND INFORMATION

MATLAB® is a product of The MathWorks, Inc. of Natick, Mass., which provides engineers, scientists, mathematicians, and educators across a diverse range of industries with an environment for technical computing applications. MATLAB® is an intuitive high performance language and technical computing environment that provides mathematical and graphical tools for mathematical computation, data analysis, visualization, and algorithm development. MATLAB® integrates numerical analysis, matrix computation, signal processing, and graphics in an easy-to-use environment where problems and solutions are expressed in familiar mathematical notation, without traditional programming. MATLAB® is used to solve complex engineering and scientific problems by developing mathematical models that simulate the problem. A model is prototyped, tested and analyzed by running the model under multiple boundary conditions, data parameters, or just a number of initial guesses. In MATLAB®, one can easily modify the model, plot a new variable or reformulate the problem in a rapid interactive fashion that is typically not feasible in a non-interpreted programming such as Fortran or C.

As a desktop application, MATLAB® allows scientists and engineers to interactively perform complex analysis and modeling in their familiar workstation environment. However, a single workstation can be limiting to the size of the problem that can be solved, because of the relationship of the computing power of the workstation to the computing power necessary to execute computing intensive iterative processing of complex problems in a reasonable time.

For example, a simulation of a large complex aircraft model may take a reasonable time to run with a single computation with a specified set of parameters. However, the analysis of the problem may also require the model be computed multiple times with a different set of parameters, e.g., at one-hundred different altitude levels and fifty different aircraft weights, to understand the behavior of the model under varied conditions. This would require five-thousand computations to analyze the problem as desired and the single computer would take an unreasonable or undesirable amount of time to perform these simulations. In this case, the single computer would be allocated full-time to performing the computation while many computer resources on the network may be idle. Additionally, the benefit of the interactive features of the software is reduced as the computation time increases.

With many engineering and scientific problems requiring larger and more complex modeling, computations accordingly become more resource intensive and time-consuming. When a computation becomes so large and complex that it cannot be completed in a reasonable amount of time on a single computer, distributed computing in a distributed technical computing environment, for example Distributed Computing Toolbox for MATLAB® and MATLAB® Distributed Computing Engine, provides a solution to decrease the computation time as needed.

In the distributed computing systems, a scheduler may be employed to distribute a given computation to remote computing entities so that the remote computing entities are able to perform the distributed computation. Jobs are collections of tasks submitted to the scheduler or scheduler for distribution.

Traditionally, once a job is submitted, the tasks of the job are fixed or frozen so that they cannot be modified or added to. This makes it difficult for certain users to actually carry out the computations that they would like. For example, a priori, a genetic algorithm does not know exactly how many evolution cycles it will need to go through to reach a satisfactory conclusion. Thus to enable a genetic algorithm in a distributed computing system, the algorithm writer needs to partition each section of the algorithm into many jobs. However, conceptually, the whole genetic algorithm is a job and that is how a user would prefer to see it. Thus what is need is a way to dynamically add tasks to a job that has been queued or started running.

SUMMARY OF THE INVENTION

The present invention provides a method and system wherein additional tasks may be added to a job after the job has been submitted to a scheduler. The added task may then be given the priority of the previously submitted dynamic job it is being added to. That is, the task added to the dynamic job may be given priority over tasks and jobs submitted before the task being added.

In accordance with a first aspect, a method is provided for distributing the processing of tasks in a distributed technical computing environment. The method involves the steps of creating tasks at a client, packaging the tasks into a dynamic job, and forwarding the dynamic job to a scheduler for distribution to a plurality of workers in the distributed technical computing environment.

In one embodiment, a task can be added to a dynamic job after the dynamic job has been forwarded to the scheduler. In some embodiments the added task is forwarded from the client. In other embodiments the added task is forwarded from a worker.

In another embodiment, once the tasks of a forwarded job are distributed to the plurality of workers, the plurality of workers execute the tasks of the dynamic job and return results. The results may be forwarded to the scheduler that in turn may forward the results to the client.

In another embodiment, the distributed technical computing environment may further include a data repository for holding information associated with the tasks of the dynamic job. The data repository has an interface that provides notification that an event concerning the tasks has occurred, action may then be taken to manage the distribution of tasks of the dynamic job among the plurality of workers based on the content of the notification. The event triggering notification may be the completion of a change in the status of a dynamic job or a task in a dynamic job.

In accordance with another aspect, a medium is provided for use on an electronic device in a distributed technical computing environment. The medium holds instructions executable using the electronic device for performing a method for distributing the processing of tasks in a distributed technical computing environment. The method includes the steps of creating tasks at a client, packaging the tasks into a dynamic job, and forwarding the dynamic job to a scheduler for distribution to a plurality of workers in the distributed technical computing environment.

In accordance with another aspect, a system is provided for distributing the processing of tasks. The system includes a client and scheduler. The client is operative to create a dynamic job comprising one or more tasks. The scheduler is operative to receive a dynamic job from the client and distribute the one or more tasks of the dynamic job for processing. The system allows for a task to be added to a dynamic job after the scheduler has received the job.

In accordance with another embodiment, in a client in a distributed technical computing environment, a method is provided for the distribution of processing. The method includes the steps of creating tasks, packaging the tasks into a dynamic job, forwarding the dynamic job to a scheduler for distribution to a plurality of workers in the distributed technical computing environment, and adding a task to the dynamic job after the dynamic job has been forwarded to the scheduler.

In accordance with another embodiment, in a scheduler in a distributed technical computing environment, a method is provided for the distribution of processing. The methods includes the steps of receiving a job comprising one or more tasks, receiving a task to be added to a received job, adding the received task to the received job, and distributing the tasks to a plurality of workers in the distributed technical computing environment.

In accordance with another embodiment, a medium is provided for use on a client in a distributed technical computing environment. The medium holds instructions executable by the client for performing a method for distributing the processing of tasks in a distributed technical computing environment. The method includes the steps of creating tasks; packaging the tasks into a dynamic job; forwarding the dynamic job to a scheduler for distribution to a plurality of workers in the distributed technical computing environment; and adding a task to the dynamic job after the dynamic job has been forwarded to the scheduler.

In accordance with another embodiment, a medium is provided for use on a scheduler in a distributed technical computing environment. The medium holds instructions executable by the scheduler for performing a method for distributing the processing of tasks in a distributed technical computing environment. The method includes the steps of receiving a job comprising one or more tasks; receiving a task to be added to a received job; adding the received task to the received job; and distributing the tasks to a plurality of workers in the distributed technical computing environment.

BRIEF DESCRIPTION OF THE DRAWINGS

The foregoing and other objects, aspects, features, and advantages of the invention will become more apparent and may be better understood by referring to the following description taken in conjunction with the accompanying drawings, in which:

FIG. 3B is a block diagram of an exemplary embodiment of the batch automatic distribution mode of operation of the present invention;

DETAILED DESCRIPTION

Figure 1A:
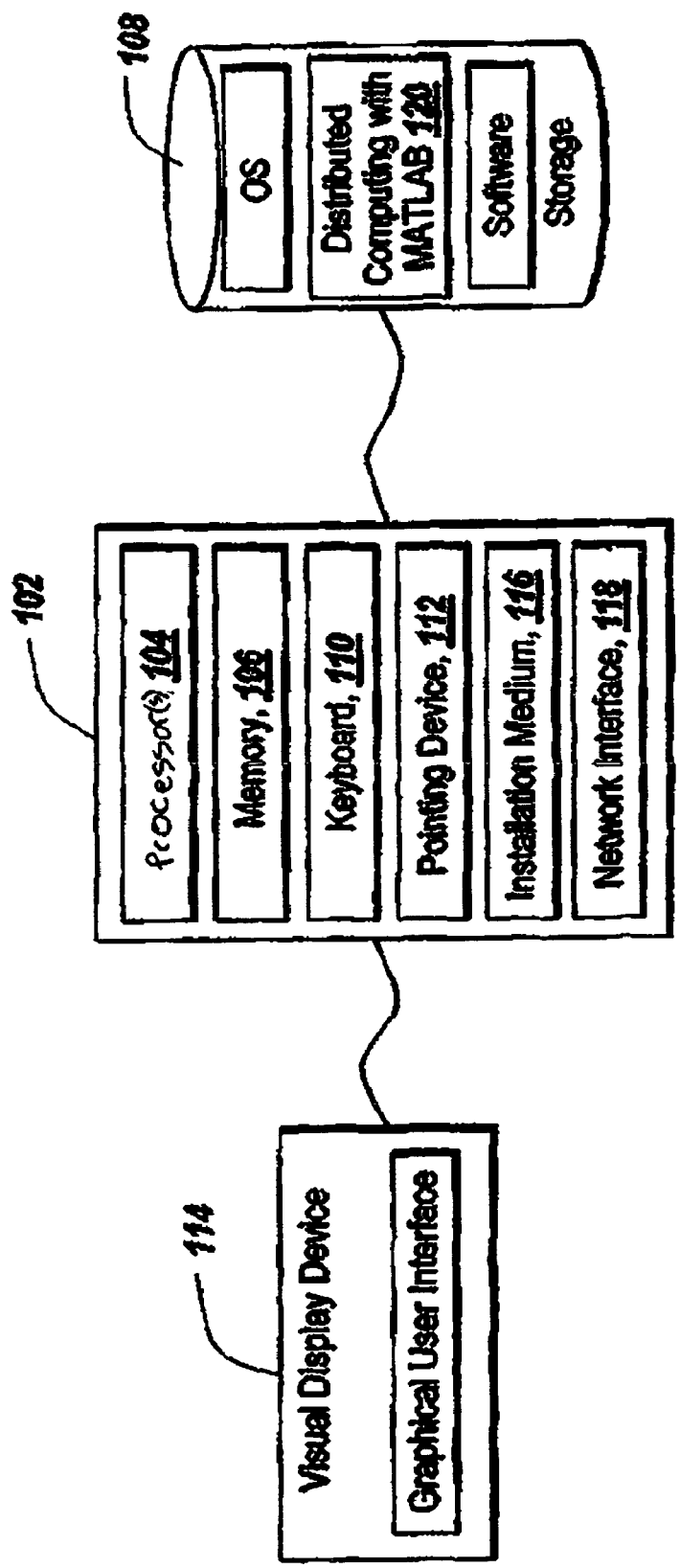
FIG. 1A is a block diagram of a computing device for practicing an embodiment of the present invention.

The illustrative embodiment of the present invention provides the ability to add tasks to a job after the job has been forwarded to a scheduler. Thus, by allowing a user to add tasks to a job once it has been started, they are able to maintain the link between the job container and the computation that the user would like to undertake. This concept also applies to almost any iterative or recursive algorithms and a number of products from The MathWorks, Inc. could apply this including, but not limited to, SystemTest, Optimization Toolbox, Statistics Toolbox, Bioinformatics Toolbox, Optimization Toolbox, Model-based Calibration Toolbox, Simulink Parameter Estimation and Genetic Algorithm and Direct Search Toolbox. This capability is also useful in the case that events, such as errors, occur where logic could be used to resubmit the previously submitted task.

Before continuing with the discussion below, it is helpful to first define a few terms used herein. The term "task" or "tasks" can be declared on a computational device in a distributed environment and defines a command, such as a MATLAB® command, to be executed, and the number of arguments and any input data to the arguments. The term "job" refers to a logical unit of activities, or tasks that are processed and/or managed collectively, such as a group of one or more tasks. A job is submitted to a scheduler to distribute the one or more tasks of the job to a plurality of workers providing technical computing services. The client does not need to specify or have knowledge of the workers in order for the tasks of the job to be distributed to and computed by the workers. The term "scheduler" refers to a mechanism that can distribute tasks to technical computing workers that are anonymous to any technical computing clients. Although the scheduler generally refers to a task manager or a task distribution mechanism with additional functions, such as a job manager, the term scheduler is used herein interchangeably with task distribution mechanism which may or may not be interrelated to a job manager. The technical computing workers perform the tasks and may return as a result the output data generated from the execution of the tasks.

As used herein the term "computational device" refers to a system on which a computational engine or computational engines reside. A computational device can include one or more computational engines. The illustrative embodiment of the present invention is described solely for illustrative purposes relative to a distributed computing with MATLAB® technical computing environment, which includes Distributed Computing Toolbox for MATLAB® and MATLAB® Distributed Computing Engine. Those skilled in the art will appreciate the Distributed Computing Toolbox for MATLAB® and a client and client machine can be used to define and submit a task, tasks, job or jobs for execution and the MATLAB® Distributed Computing Engine executes the task, tasks, job or jobs on a worker machine such as a technical computing worker. Although the illustrative embodiment of the present invention is described relative to a distributed computing with MATLAB® based application, one of ordinary skill in the art will appreciate that the present invention may be applied to distributing the processing of technical computing tasks with other technical computing environments, such as technical computing environments using software products of LabView® or MATRIXx from National Instruments, Inc., or Mathematica® from Wolfram Research, Inc., or MathCAD of Mathsoft Engineering & Education Inc., or Maple™ from Maplesoft, a division of Waterloo Maple Inc., or Octave.

FIG. 1A depicts a client machine suitable for practicing an illustrative embodiment of the present invention. The client machine 102 includes memory 106, on which software according to one embodiment of the present invention may be stored, one or more processors (CPU) 104 for executing software stored in the memory 106, and other programs for controlling system hardware. Although an illustrative embodiment of the present invention is discussed below in relation to, a distributed environment associated with a network this is not limiting of the present invention for the concepts and technical features discussed herein are equally applicable to distributed environments that may not be associated with a network. That is, the client machine 102 is configurable as a tightly coupled multiple processor system or the one or more processors 104 can be of a processor type having multiple cores. As such, in a tightly coupled environment, a task or tasks are distributed amongst the multiple processors or amongst the multiple cores using a bus or multiple bus structures. Accordingly, as discussed below a network 140 and a network communication channel 130 are analogous to multiple processors and a bus or other interconnection structure, such as conductive paths formed in or on a printed circuit board, that interconnect the multiple processors or interconnect multiple cores of a processor.

The memory 106 may comprise a computer system memory or random access memory such as DRAM, SRAM, EDO RAM, etc. The memory 106 may comprise other types of memory as well, or combinations thereof. A human user may interact with the client machine 102 through a visual display device 114 such as a computer monitor, which may render a graphical user interface (GUI). The client machine 102 may include other I/O devices such a keyboard 110 and a pointing device 112, for example a mouse, for receiving input from a user. Optionally, the keyboard 110 and the pointing device 112 may be connected to the visual display device 114. The client machine 102 may include other suitable conventional I/O peripherals. The client machine 102 may support any suitable installation medium 116, a CD-ROM, floppy disks, tape device, USB device, hard-drive or any other device suitable for installing software programs such as Distributed computing with MATLAB® 120. The client machine 102 may further comprise a storage device 108, such as a hard-drive or CD-ROM, for storing an operating system and other related software, and for storing application software programs such as Distributed computing with MATLAB® 120 of the present invention. Additionally, the client machine 102 may include a network interface 118 to interface to a Local Area Network (LAN), Wide Area Network (WAN) or the Internet through a variety of connections including, but not limited to, standard telephone lines, LAN or WAN links (e.g., 802.11, T1, T3, 56 kb, X.25), broadband connections (e.g., ISDN, Frame Relay, ATM), wireless connections, or some combination of any or all of the above. The network interface 118 may comprise a built-in network adapter, network interface card, PCMCIA network card, card bus network adapter, wireless network adapter, USB network adapter, modem or any other device suitable for interfacing the computing device 118 to any type of network capable of communication and performing the operations described herein. Moreover, the client machine 102 may be any computer system such as a workstation, desktop computer, server, laptop, handheld computer or other form of computing or telecommunications device that is capable of communication and that has sufficient processor power and memory capacity to perform the operations described herein.

Figure 1B:
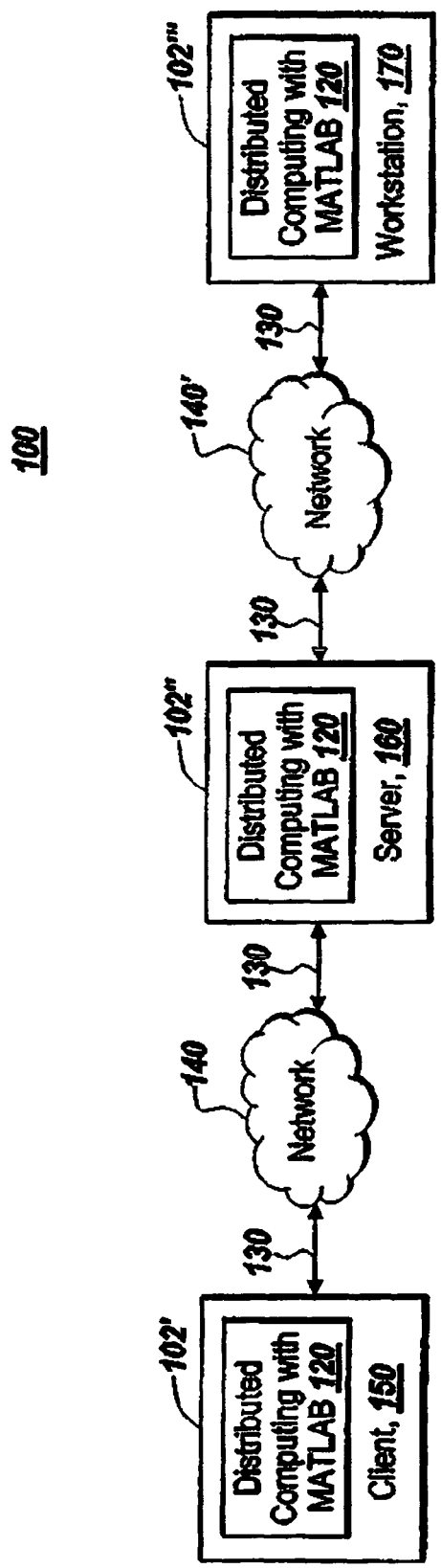
FIG. 1B is a block diagram of a distributed computing system for practicing an illustrative embodiment of the present invention.

FIG. 1B depicts an environment suitable for practicing an illustrative embodiment of the present invention, where the functionality of Distributed computing with MATLAB® 120 is distributed across multiple client machines (102', 102" and 102'''). In a broad overview, the system 100 depicts a multiple-tier or "n-tier" networked computer system for performing distributed software applications such as the distributed technical computing environment of the present invention. The system 100 includes a client 150 (e.g., a first client machine 102') in communications through a network communication channel 130 with a server computer 160, also known as a server, (e.g., a second client machine 102") over a network 140 and the server in communications through a network communications channel 130 with a workstation (e.g., a third client machine 102''') over the network 140'. The client 150, the server 160, and the workstation 170 can be connected 130 to the networks 140 and/or 140' through a variety of connections including, but not limited to, standard telephone lines, LAN or WAN links (e.g., 802.11, T1, T3, 56 kb, X.25), broadband connections (e.g., ISDN, Frame Relay, ATM), wireless connections, or some combination of any or all of the above. Each of the client 150, server 160 and workstation 170 can be any type of client machine (102', 102" and 102''') as described above and respectively configured to be capable of computing and communicating the operations described herein.

In one embodiment, each of the client 150, server 160 and workstation 170 are configured to and capable of running at least a portion of the Distributed computing with MATLAB® 120. As a distributed software application, Distributed computing with MATLAB® 120 has one or more software components that run on each of the client 150, server 160, and workstation 170, respectively, and work in communication and in collaboration with each other to meet the functionality of the overall application. For example, the client 150 may hold a graphical modeling environment that is capable of specifying block diagram models and technical computing tasks to analyze the model. The client 150 may have software components configured to and capable of submitting the tasks to the server 160 (i.e., Distributed Computing Toolbox for MATLAB®). The server 160 may have software components configured to and capable of receiving the tasks submitted by the client 150 and for determining a workstation 170 to assign the task for technical computing. The workstation 170 may hold software components capable of providing a technical computing environment to perform technical computing of the tasks assigned from the server 160 and submitted by the client 150 (i.e., MATLAB® Distributed Computing Engine). In summary, the technical computing environment and software components of the Distributed computing with MATLAB® 120 application may be deployed across one or more different computing devices in various network topologies and configurations.

Figure 2:
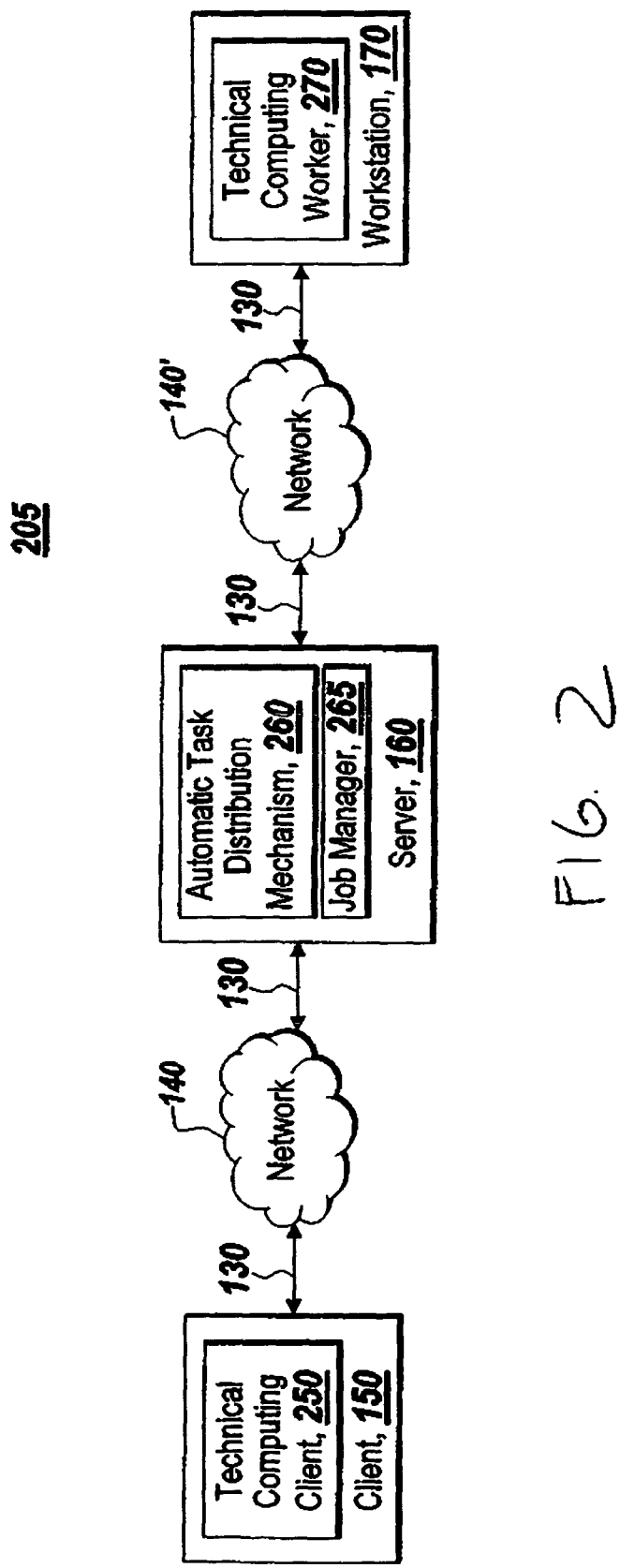
FIG. 2 is a block diagram of the components of an alternative embodiment of the present invention in a networked computer system.

FIG. 2 shows another illustrative embodiment of distributed computing environment the having a multi-tier distributed computer system. The multi-tier distributed system 205 includes a technical computing client 250 running on a client computer 150 in communications over a network communication channel 130 to a server 160 on a network 140. The server 160 implements a scheduler, which in this embodiment comprises an automatic task distribution mechanism 260 and a job manager 265. The job manager 265 interfaces with the automatic task distribution mechanism 260 on the server 160. The automatic task distribution mechanism 260 communicates over a network communication channel 130 on the network 140 to the technical computing worker 270 on the workstation 170.

The automatic task distribution mechanism 260 comprises one or more application software components to provide for the automatic distribution of tasks from the technical computing client 250 to the technical computing worker 270. The automatic task distribution mechanism 260 allows the technical computing client 250 to delegate the management of task distribution to the automatic task distribution mechanism 260. For example, a task can be defined and submitted to the automatic task distribution mechanism 260 without specifying which technical computing worker 270 is to perform the technical computing of the task. The technical computing client 250 does not need to know the specifics of the technical computing worker 270. The technical computing client can define a function to submit the task to the automatic task distribution mechanism 260, and get a result of the task from the automatic task distribution mechanism 260. As such, the automatic task distribution mechanism provides a level of indirection between the technical computing client 250 and the technical computing worker 270.

This eases the distributed programming and integration burden on the technical computing client 250. The technical computing client 250 does not need to have prior knowledge of the availability of the technical computing worker 270. For multiple task submissions from the technical computing client 250, the automatic task distribution mechanism 260 can manage and handle the delegations of the tasks to the same technical computing worker 270, or to other technical computing workers, e.g., 270 and 270', and hold the results of the tasks on behalf of the technical computing client 250 for retrieval after the completion of technical computing of all the distributed tasks.

As part of the software components, a job manager module 265, or "job manager", is included as an interface to the task and result management functionality of the automatic task distribution mechanism 260. The job manager 265 can comprise an interface to provide control of delegating tasks and obtaining results in the multi-tiered distributed system 205. The job manager 265 provides a level of programming and integration abstraction above the details of inter-process communications and workflow between the automatic task distribution mechanism 260 and the technical computing worker 270. The job manager 265 also provides an interface for managing a group of tasks collectively as a single unit called a job, and on behalf of a technical computing client 250, submitting those tasks making up the job, and obtaining the results of each of the tasks until the job is completed. Alternatively, the automatic task distribution mechanism 260 can include the functionality and object-oriented interface of the job manager 265, or the automatic task distribution mechanism 260 and the job manager 265 can be combined into a single application, or software component. In an exemplary embodiment, the job manager 265 comprises both the functionality of the job manager 265 and the automatic task distribution mechanism 260. One ordinarily skilled in the art will recognize the functions and operations of the job manager 265 and the automatic task distribution mechanism 260 can be combined in various software components, applications and interfaces.

The computing devices (102; 102', 102", 102"') depicted in FIGS. 1A and 1B can be running any operating system such as any of the versions of the Microsoft® Windows operating systems, the different releases of the Unix and Linux operating systems, any version of the MacOS® for Macintosh computers, any embedded operating system, any real-time operating system, any open source operating system, any proprietary operating system, any operating systems for mobile computing devices, or any other operating system capable of running on the computing device and performing the operations described herein. Furthermore, the software components for distributed computing using MATLAB® can be capable of and configured to operate on the operating system that may be running on any of the computing device (e.g., 102, 102', 102", 102"'). Additionally, each of the client 150, the server 160 and the workstation 170 can be running the same or different operating systems. For example, the client 150 can running Microsoft® Windows, the server 160 can be running a version of Unix, and the workstation a version of Linux. Or each of the client 150, the server 160 and the workstation 170 can be running Microsoft® Windows. Additionally, the software components of for distributed computing using MATLAB® can be capable of and configured to operate on and take advantage of different processors of any of the computing device (e.g., 102, 102', 102", 102"'). For example, the software can run on a 32 bit processor of one computing device 102 and a 64 bit processor of another computing device 102'. In a distributed system, such as the system depicted in FIG. 1B, distributed computing with MATLAB® can be performed on computing devices (102, 102', 102", 102") that can be running on different processor architectures in addition to different operating systems. One ordinarily skilled in the art will recognize the various combinations of operating systems and processors that can be running on any of the computing devices (102, 102', 102", and 102"').

Although the present invention is discussed above in terms of distributing software components across the computing devices of a client 150, server 160 and workstation 170, any other system and/or deployment architecture that combines and/or distributes one or more of the technical computing client 250, job manager 265, automatic task distribution mechanism 260 and technical computing worker 270 across any other computing devices and operating systems available in the network 140 may be used. Alternatively, all the software components can run on a single computing device 102, such as the client 150, server 160 or the workstation 170. The software components may also be spread across the computing devices 120 in any number of ways. For example, the computing client 250 and job manager 265 may be run on the client 150 while the automatic task distribution mechanism 260 and technical computing worker 270 run on a workstation 170. Other implementation and embodiments will be apparent to one skilled in the art given the benefit of this disclosure.

Figure 3A:
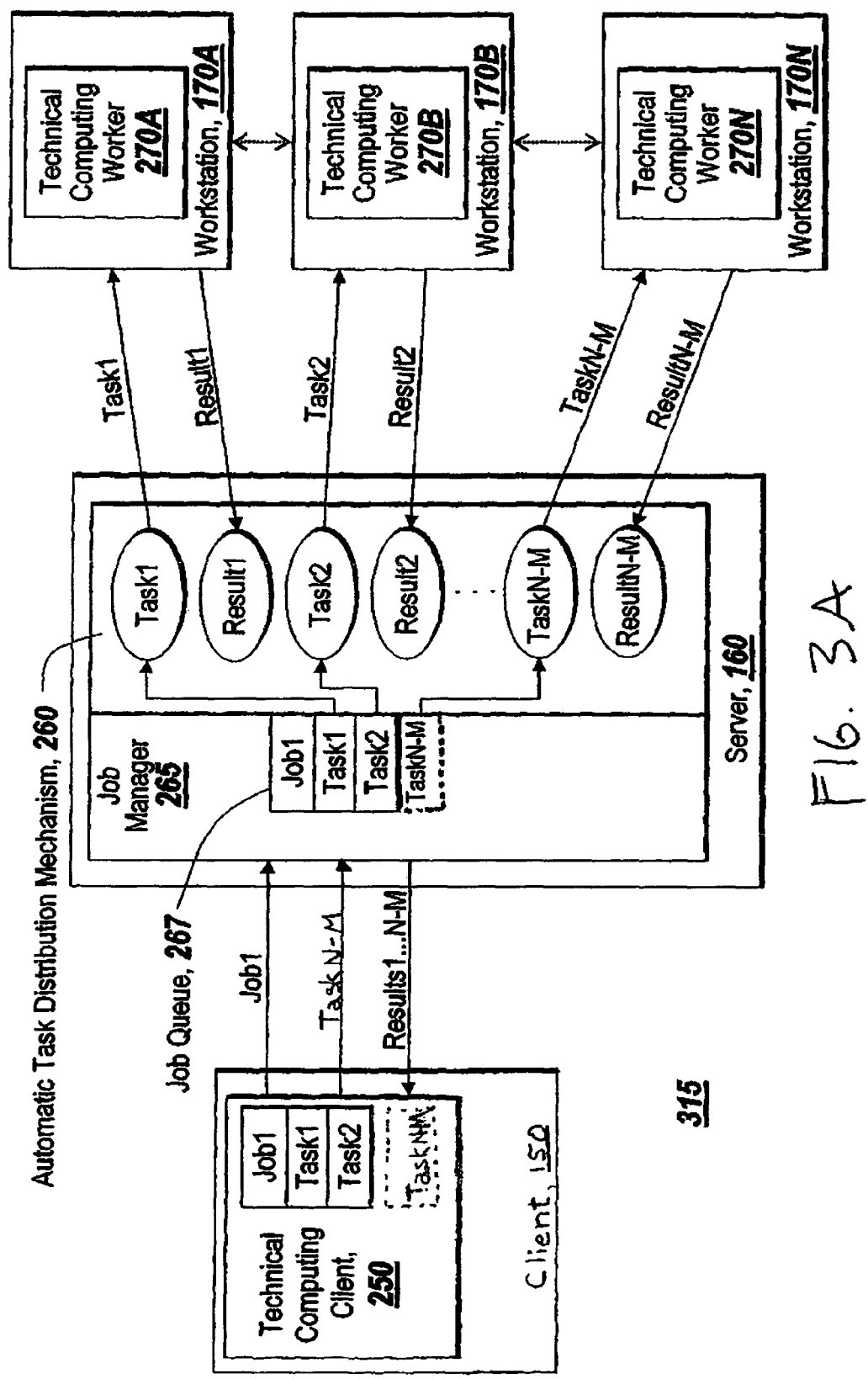
FIG. 3A is a block diagram of the batch automatic distribution mode of operation of the present invention.

Distributed computing provides flexibility in methods of task distribution with multiple modes of operation. FIG. 3A depicts one embodiment of automated distribution used in the present invention. FIG. 3B depicts an exemplary embodiment of automated distribution.

The implementation of automated task distribution embodied in system 315 of FIG. 3A is intended to provide a configuration where the user can specify a group of related tasks as a job, such as a dynamic job, and provide the batch of tasks, or the dynamic job, to the automatic task distribution mechanism 260. In brief overview of the automatic distribution system 315, a technical computing client 250 is in communication with the job manager 265 on the server 160. The job manager 265 interfaces and communicates with the automatic task distribution mechanism 260 running on the same server 160. Each of the technical computing workers 270A-

270N is in communication with the automatic task distribution mechanism 260. A job manager 265 interfaces with and is associated with one automatic task distribution mechanism 260. In some embodiments, a plurality of job managers and automatic task distribution mechanisms could be running on a single server 160 or each on their own server (160', 160'', etc). Each of the plurality of job managers interface with and are associated with one of the plurality of automatic distribution mechanisms. This allows the distributed system to scale the number of instances of the job manager 265 and the automatic distribution mechanism 260 to handle additional multiple technical computing clients 250 distributing tasks.

In the system as depicted in FIG. 3A, the technical computing client 250 defines the dynamic job. The technical computing client 250 has a programming language environment by which it can declare tasks, declare a dynamic job and associate the tasks with the job. The technical computing client 250 submits the dynamic job containing all the associated tasks to the job manager 265. The job manager 265 obtains the tasks from the dynamic job and provides the tasks to the automatic task distribution mechanism 260 for technical computing workers 270A-270N to take and compute results. For example, technical computing client 250 defines a dynamic job, Job1, with a set of two tasks: Task1 and Task2. The technical computing client 250 then submits Job1 to the job manager 265. The job manager 265 obtains Job1 and obtains each of the tasks, Task1-Task2 from Job 1. Then, according to the configured logic of the job manager 265, described in more detail below, the job manager 265 submits each of the tasks to the automatic task distribution mechanism 260 for technical computing by a technical computing worker 270A-270N. Technical computing worker 270A may take Task1 from the automatic task distribution mechanism 260, compute a Result1 for Task1 and provide the Result1 to the automatic task distribution mechanism 260. Technical computing worker 270B, in a similar fashion computes and provides a result for Task2. The job manager 265 then obtains the set of results for the completed job of Job1 and provides the results of each of the tasks to the technical computing client 250.

In the present invention, the use of a dynamic job allows for additional tasks, such as TaskN-M to be added to the dynamic job, in this case Job 1, after the technical computing client 250 has submitted the job (Job 1) to the scheduler, in this case the job manager 265 and automatic task distribution mechanism 260. In the system of FIG. 3A, the technical computing client 250 declares the task (TaskN-M) and then associates the task with the submitted dynamic job (Job 1) and then submits the task to the job manager 265. The added task (TaskN-M) may be declared by the user using a command line or the added task may be declared based on result returned to the client, for example, via a callback. In another embodiment, the added task may be submitted by a technical computing worker 270A-270B. For example, the result of a task may the addition of a task to the dynamic job currently being processed (Job1). Then, according to the configured logic of the job manager 265, described in more detail below, the job manager 265 submits the task, TaskN-M to the automatic task distribution mechanism 260 for technical computing by a technical computing worker such as 270N. Technical computing worker 270N may take TaskN-M from the automatic task distribution mechanism 260, compute a ResultN-M for TaskN-M and provide the ResultN-M to the automatic task distribution mechanism 260.

The job manager 265 further comprises a queue 267 for arranging and handling submitted jobs. For example, the job manager 265 may handle jobs in a first-in first-out (FIFO) manner. In this case, the job manager 265 does not process the next job until all the tasks from the current job have been processed by the automatic task distribution mechanism 260. Additionally, the job manager 265 using the queue 267 supports handling multiple job submissions and task distribution from multiple technical computing clients 250. If a first technical computing client 250 submits a job, Job1, the job manager 265 places that job first in the queue 267. If a second technical computing client, e.g., 250', submits a second Job, for example, Job 2, the job manager places the job in the queue behind the Job1 from the first client. In this manner, all technical computing clients (250, 250', 250'') accessing the services of the job manager 265 get serviced for task distribution. One ordinarily skilled in the art will recognize that the job manager 265 could implement a variety of algorithms for processing jobs in a job queue 267 and for handling multiple technical computing clients (250, 250', 250''). For example, a user may be able to specify a priority level for a specified job, or the logic of the job manager 265 may make task distributing and processing decisions based on the configuration and availability of technical computing workers 270A-270B to determine a preferred or optimal selection of technical computing of jobs and tasks.

In the present invention, when the technical computing client 250 adds a task, such as TaskN-M, to a submitted dynamic job, such as Job 1, the task, TaskN-M, receives the same priority as the tasks of Job 1 and is placed in the queue 267 with the other tasks of Job 1. In the FIFO example of above, this means that the task added to Job 1 will be processed before the tasks of Job 2.

The exemplary embodiment of the batch mode of automated task distribution system 320 of FIG. 3B depicts a configuration where the job manager 265 contains the automatic task distribution mechanism 260. In brief overview of system 320, a technical computing client 250 is in communication with the job manager 265 on the server 160. The job manager 265 comprises a task distribution mechanism 260 running as part of the job manager 265 on the same server 160. The job manager 265 further comprises a queue 267 for arranging and handling submitted jobs. The technical computing workers 270A-270N are in communication with the job manager 265 to receive tasks from the automatic task distribution mechanism 260 of the job manager 265.

In operation, the technical computing client 250 as depicted in FIG. 3B defines the dynamic job comprised of related tasks. The technical computing client 250 submits the dynamic job containing all the related tasks to the job manager 265. The job manager 265 obtains the tasks from the dynamic job and submits the tasks, via an automatic task distribution mechanism 260, to the technical computing workers 270A-270N to perform technical computing. For example, technical computing client 250 defines a dynamic job, Job1, with a set of two tasks: Task1 and Task2. The technical computing client 250 then submits Job1 to the job manager 265. The job manager 265 obtains Job1 and obtains each of the tasks, Task1-Task2, from Job 1. Then, the automatic task distribution mechanism 260 of the job manager 265 submits each of the tasks to a technical computing worker 270A-270N for technical computing. For example, the job manager 265 may submit Task 1 to technical computing worker 270A to compute and produce a Result1 for Task1. Technical computing worker 270A provides the Result1 to the job manager 265. In a similar fashion, the job manager 265 may submit Task2 to technical computing worker 270B with technical computing worker 270B providing the results for Task2 to the job manager 265. Additional tasks, such as TaskN-M, may also be added to Job 1 after Job 1 is submitted.

When all the results from each of the tasks of Job1 are received, the job manager 265 then provides the results of each of the tasks of Job 1 to the technical computing client 250.

In operation, the job manager 265 or automatic task distribution mechanism 260 can be configured to define the minimum and maximum numbers of technical computing workers 270A-270N to perform the tasks associated with a job. This feature can be configured on a job by job basis. Alternatively, it may be configured for a portion or all of the jobs. The configuration of these settings can be facilitated through parameters associated with a submitted job, such as in one or more properties of a job object, or in one or more fields of a data structure representing a job. Alternatively, these settings may be facilitated through any interface of the job manager 265 or automatic task distribution mechanism 260, such as in a configuration file, graphical user interface, command or message or any other means by which values for these settings may be set.

The system (e.g. 315 or 320) can compare the number of technical computing workers 270A-270N registered, or otherwise available, with the job manager 265 or automatic task distribution mechanism 260 against the configured setting of the minimum number of technical computing workers parameter. The system may not start a job unless there is a minimum number of technical computing workers 270A-270N registered or available to work on the job. In a similar manner, the system can check the number of available or registered technical computing workers 270A-270N against the setting of the maximum number of technical computing workers parameter. As the system distributes tasks of a job, it can make sure not to distribute tasks to more than the defined number of technical computing workers 270A-270N. In some embodiments, the minimum number of technical computing workers will be set to a value equal to the setting of the maximum number of technical computing workers. In such a case, the system may only start the job if the minimum number of technical computing workers 270A-270A are available or registered to start the job, and may not use any more technical computing workers 270A-270N than the minimum setting. This is useful for cases where the user wants to configure a job to have each task be assigned to and run on separate technical computing workers 270A-270N. For example, a job may have 5 tasks and the minimum and maximum technical computing worker settings may be set to 5. Other implementation and embodiments will be apparent to one skilled in the art given the benefit of this disclosure.

Figure 4:
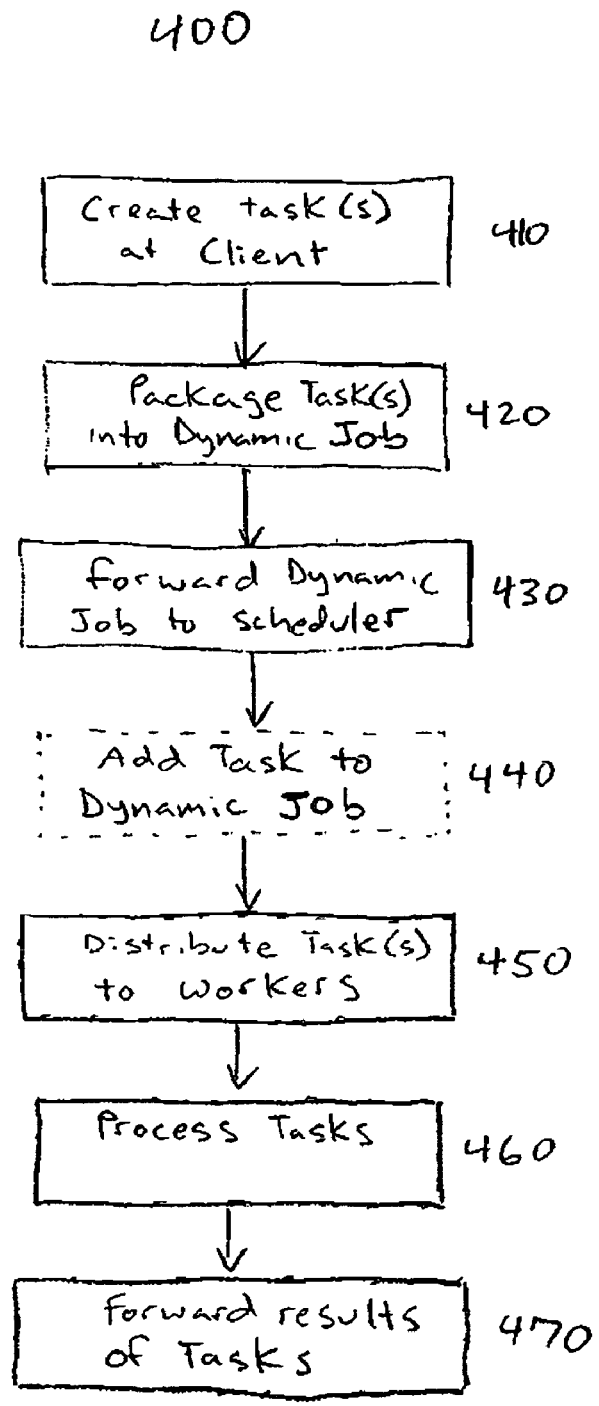
FIG. 4 is an exemplary flow diagram for a method of one embodiment of the present invention.

FIG. 4 is a high level flow chart 400 of one embodiment of a method of the present invention. The first step is creating one or more tasks at a client such as the technical computing client 250 in the examples above (step 410). The one or more tasks are then packaged into a dynamic job (step 420). The dynamic job is then forwarded to a scheduler, such as the job manager 265 and automatic task distribution mechanism 260 in the examples above (step 430). The present invention then allows for a task to be then added to the forwarded dynamic job (step 440). The tasks of the forwarded job can then be distributed to one or more workers such as the technical computing workers 270A-270N (step 450). The workers can then process the distributed tasks (step 460). The results of the processed tasks can then be forwarded from the workers back to the scheduler and then the client (step 470). Other implementation and embodiments will be apparent to one skilled in the art given the benefit of this disclosure.

Figure 5A:
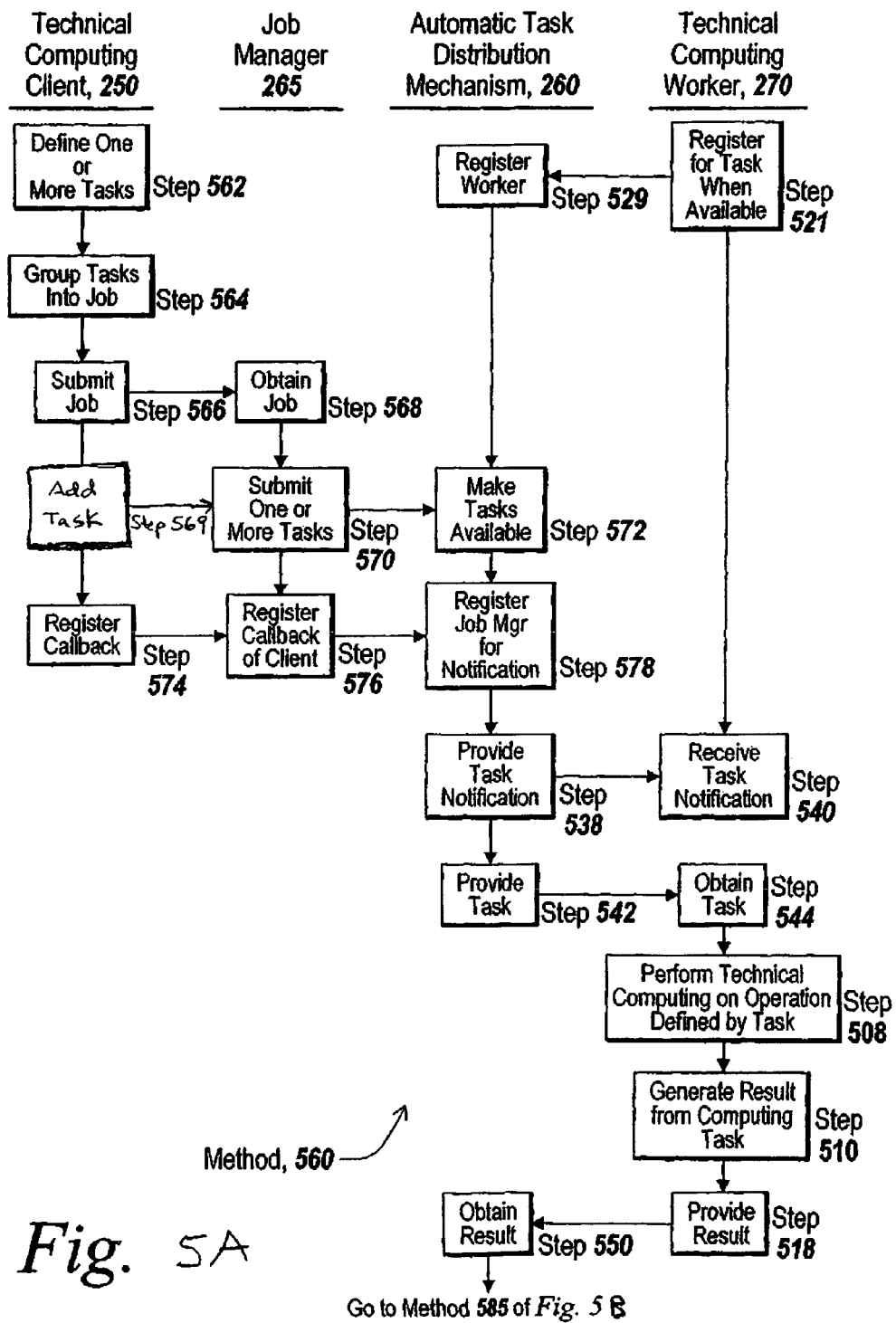
FIG. 5A and FIG. 5B are flow diagrams of steps performed during operation of another embodiment of the present invention.
Figure 5B:
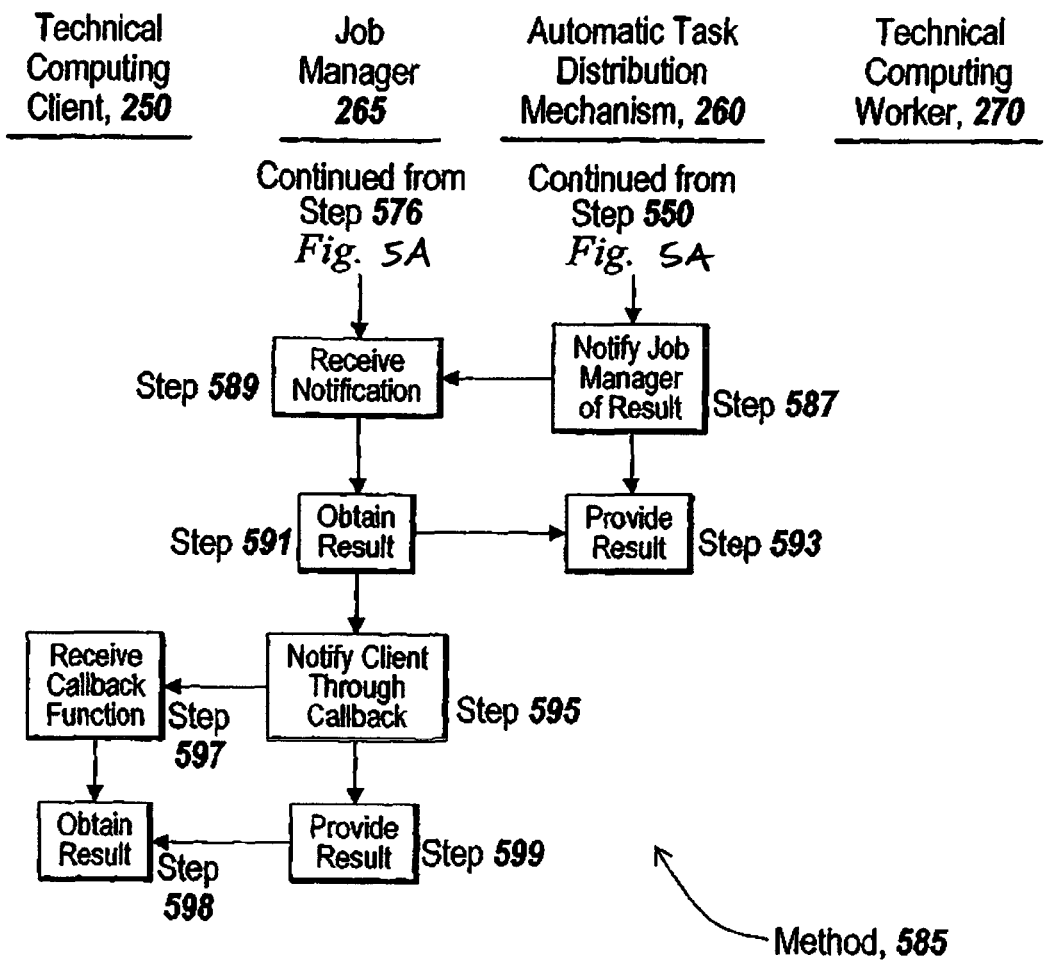

A more detailed embodiment of the methodology in reference to the FIGS. 3A and 3B can be seen in FIGS. 5A and 5B. Here, one embodiment of the method 560 to distribute a task from a technical computing client 250 to a technical computing worker 270 is illustrated. Method 560 is practiced with the automatic task distribution system (e.g. 315 or 320). A technical computing worker 270 registers to receive notification of one or more tasks (step 521) becoming available, or appearing, in the automatic task distribution mechanism 260. In an exemplary embodiment, the technical computing worker registers to receive a task from the job manager 265 or automatic task distribution mechanism 260 as notification to perform computing on the task. The technical computing client 250 defines one or mores tasks (step 562), with one or more of the tasks comprising an operation or function for technical computing. The technical computing client 250 groups one or more tasks of the tasks into a dynamic job (step 564). The technical computing client 250 then submits the dynamic job (step 566) to the job manager 265. The job manager 265 obtains the job (step 568) from the technical computing client 250. A task may then be added to the dynamic job submitted to the job manager 265 (step 569). The job manager 265 then provides the one or more tasks of the job (step 570) to the automatic task distribution mechanism 260, which makes the one or more tasks available for distribution (step 572) to one or more technical computing workers 270A-270N. In an exemplary embodiment, the job manager 265 or the automatic task distribution mechanism 260 may submit the one or more tasks to the one or more technical computing workers 270A-270N. In another embodiment, the technical computing worker 270 may take the task from the job manager 265 or the automatic task distribution mechanism 260.

The technical computing client 250 registers (step 574) a callback function with the job manager 265. The technical computing client 250 may setup and/or register other callback functions based on changes in the state of processing of a task or job, or changes in the state of the job manager, or other events available to trigger the calling of a function. The job manager 265 calls this function when the job is completed, i.e., when each of the one or more tasks of the job have been completed. In turn, the job manager 265 may register (step 576) with the automatic task distribution mechanism 260 to receive notification of the results of the submitted tasks appearing in the automatic task distribution mechanism 260, or being received from the technical computing worker 270A-270N. In one embodiment, the automatic task distribution mechanism 260 registers the notification request of the job manager (step 578). Then, the automatic task distribution mechanism 260 provides notification to the technical computing worker 270 of the availability of the task (step 538). In an exemplary embodiment, the task is sent, by the job manager 265 to the technical computing worker 270 as notification to perform the task. In response to receiving the notification or the task (step 540), the technical computing worker 270 obtains (step 542) the task provided (step 540) from the automatic task distribution mechanism 260 or the job manager 265. The technical computing worker 270 performs the requested technical computing on the operation as defined by the task (step 508). In performing the technical computing on the task, an associated result may be generated (step 510). In alternative embodiments, either no result is generated or the result is not required to be returned to the technical computing client 250. After generating the result from computing the task (step 510), the technical computing worker 270 provides the result (step 510) to the automatic task distribution mechanism 260 or the job manager 265. After obtaining the result from the technical computing worker 250 (step 550), the automatic task distribution mechanism 260 notifies (step 587) the job manager 265 that the result is available. In an exemplary embodiment, the job manager 265 receives the results from the technical computing worker 270. In response to receiving the notification or the result (step 589), the job manager 265 obtains the result (step 591) provided by (step 593) the automatic task distribution mechanism 260. If the job manager 265 received the last result of the job, the job manager 265 will notify the technical computing client 250 that the job is completed via the registered callback function (step 595). After triggering the completed job callback function (step 597), the technical computing client 250 obtains (step 598) the result provided (step 599) by the job manager 265.

Figure 6:
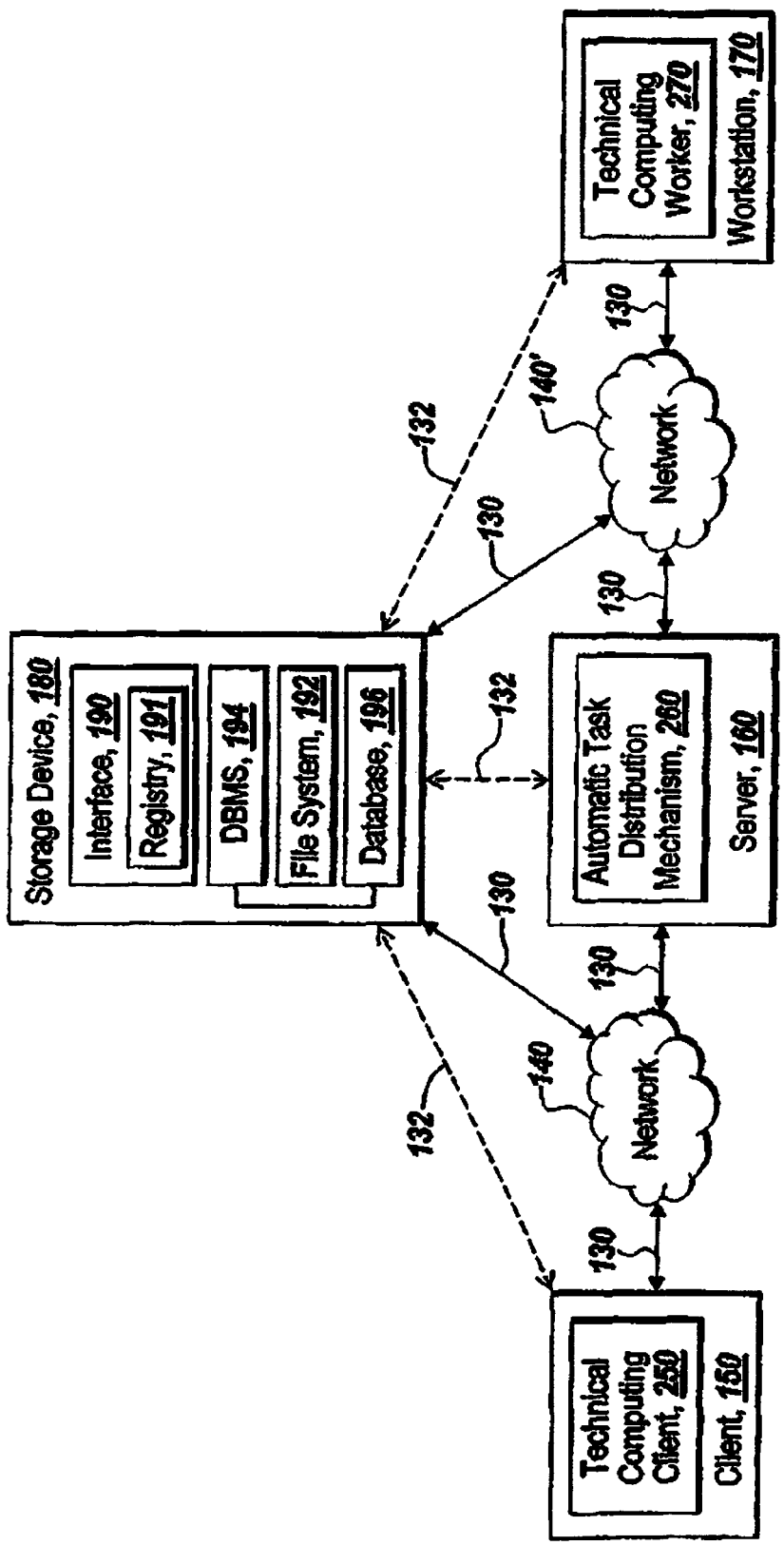
FIG. 6 is a block diagram of the components of an alternative embodiment of the present invention in a networked computer system.

In another embodiment depicted in FIG. 6, the system of the distributed technical computing environment 205 may further include data repository or storage device 180 in communication with the client 150, server 160, and workstation 170. The concept of a data repository or storage device in a distributed technical computing environment is disclosed in more detail in U.S. application Ser. No. 11/195,927 filed on Aug. 2, 2005 entitled "Method and System for Distributing Data to Technical Computing Workers." The specification of which is herein incorporated.

In FIG. 6, the storage device 180 includes an interface 190, and a file system 192, a database management system 194 and an associate database 196, or both. The interface 190 receives communications, such as data and instructions from the technical computing client 250, the automatic task distribution mechanism 260, and the technical computing worker 270, to connect each entity to the file system 192 and the database management system 194. The technical computing client 250, the automatic task distribution mechanism 260, and the technical computing worker 270 can communicate with the interface 190 on a dedicated communication line 132 or via network 140, or network 140', over the network communication channel 130. The interface 190 can also send or forward communications, such as data and instructions to the technical computing client 250, the automatic task distribution mechanism 260, and the technical computing worker 270 to, amongst other things, connect each entity to the file system 192 and the database management system 194.

The interface 190 includes one or more software components to provide connectivity between the technical computing client 250, the technical computing worker 270, the automatic task distribution 260, the file system 192, and the database management system 194. The interface 190 is able to monitor and manage the transfer of data associated with tasks between any or all of the technical computing client 250, the technical computing worker 270, and the storage device 180. The associated data can be a result or results from a task performed by the technical computing worker 270, or data needed by the technical computing worker 270 to complete a task requested by the technical computing client 250.

The interface 190 can include a registry 191 to allow entities of the distributed technical computing environment 205 to register with the interface 190 to receive notice of an occurrence of one or more pre-defined data events. Such pre-defined data events include, but are not limited to, receipt of data at the interface 190 from the technical computing client 250; receipt of data at interface 190 from the technical computing worker 270, transmission of data from the interface 190 to the technical computing worker 270; transmission of data from the interface 190 to the technical computing client 250; notice that one or more values in a data structure have changed; the addition of a task to a dynamic job, notice that the interface 190 did not receive data from the technical computing client 250; notice that the interface 190 did not receive data from the technical computing worker 270; notice that the interface 190 received incomprehensible data from the technical computing worker 270, for example, data of a wrong data type, format, length, and the like; notice that the interface 190 received incomprehensible data from the technical computing client 250; notice that the file system 192 or the database 196 is nearing storage capacity, and the like. In some embodiments of the present invention the interface 190 may add a task to a dynamic job based on information the interface receives from the technical computing client 250 or the technical computing worker 270. Other implementation and embodiments will be apparent to one skilled in the art given the benefit of this disclosure.

Many alterations and modifications may be made by those having ordinary skill in the art without departing from the spirit and scope of the invention. Therefore, it must be expressly understood that the illustrated embodiments have been shown only for the purposes of example and should not be taken as limiting the invention, which is defined by the following claims. These claims are to be read as including what they set forth literally and also those equivalent elements which are insubstantially different, even though not identical in other respects to what is shown and described in the above illustrations.

What is claimed is:

1. A method for distributing the processing of tasks in a distributed technical computing environment, the method comprising:
   creating tasks with a client;
   packaging the tasks into a dynamic job with the client;
   forwarding the dynamic job from the client to a scheduler for distribution to a plurality of workers in the distributed technical computing environment;
   placing the dynamic job in a queue at the scheduler for distribution;
   assigning a priority to the dynamic job in the queue; and
   with the scheduler, adding an additional task from the client to the dynamic job in the queue at the scheduler, after the dynamic job has been forwarded to the scheduler, where the adding comprises:
      applying the priority of the dynamic job in the queue to the additional task;
   distributing the tasks of the dynamic job to the plurality of workers in the distributed technical computing environment;
   executing the tasks of the dynamic job on the plurality of workers; and
   computing results of the executed tasks by the plurality of workers.

2. The method of claim 1, wherein the additional task is added in response to a request submitted via a command line.

3. The method of claim 1, wherein the added task is additional based on a callback.

4. The method of claim 1, wherein the additional task is forwarded to a worker.

5. The method of claim 1, further comprising:
   forwarding the results of the executed tasks from the plurality of workers to the scheduler.

6. The method of claim 5, wherein the results are forwarded from the scheduler to the client.

7. The method of claim 1, further comprising the steps of:
   receiving notification from an interface to a data repository for holding data associated with the tasks of the dynamic job that an event concerning the tasks has occurred; and
   taking an action to manage distribution of the tasks of the dynamic job among the plurality of workers based on the notification.

8. The method of claim 7, wherein the scheduler comprises an automatic task distributing mechanism and a job manager.

9. A computer-readable storage medium for use on an electronic device in a distributed technical computing environment, the medium holding instructions executable using the electronic device for distributing the processing of tasks in a distributed technical computing environment, the medium holding one or more instructions for:
creating tasks with a client;
packaging the tasks into a dynamic job with the client;
forwarding the dynamic job from the client to a scheduler for distribution to a plurality of workers in the distributed technical computing environment;
placing the dynamic job in a queue at the scheduler for distribution;
assigning a priority to the dynamic job in the queue; and
with the scheduler, adding an additional task from the client to the dynamic job in the queue at the scheduler, after the dynamic job has been forwarded to the scheduler, where the adding comprises:
applying the priority of the dynamic job in the queue to the additional task;
distributing the tasks of the dynamic job to the plurality of workers in the distributed technical computing environment;
executing the tasks of the dynamic job on the plurality of workers; and
computing results of the executed tasks by the plurality of workers.

10. The computer-readable storage medium of claim 9, wherein the additional task is forwarded from the client.

11. The computer-readable storage medium of claim 10, wherein the additional task is added in response to a request submitted via a command line.

12. The computer-readable storage medium of claim 10, wherein the additional task is added via a callback.

13. The computer-readable storage medium of claim 9, wherein the additional task is forwarded to a worker.

14. The computer-readable storage medium of claim 9, further holding one or more instructions for:
forwarding the results of the executed tasks from the plurality of workers to the scheduler.

15. The computer-readable storage medium of claim 14, wherein the results are forwarded from the scheduler to the client.

16. The computer-readable storage medium of claim 9, further holding one or more instructions for:
receiving notification from an interface to a data repository for holding data associated with the tasks of the dynamic job that an event concerning the tasks has occurred; and
taking an action to manage the distribution of the tasks of the dynamic job among the plurality of workers based on the notification.

17. The computer-readable storage medium of claim 9, wherein the client and scheduler are on the same electronic device.

18. The computer-readable storage medium of claim 9, wherein the scheduler comprises an automatic task distributing mechanism and a job manager.

19. A system for distributing the processing of tasks, the system comprising:
a client for creating a dynamic job comprising a plurality of tasks; and
a scheduler for:
receiving a dynamic job from the client,
placing the dynamic job in a queue for distribution,
assigning a priority to the dynamic job in the queue,
distributing the one or more tasks of the dynamic job for processing, wherein a task is added to the dynamic job by the scheduler, after the scheduler has received the job, and
applying the priority of the dynamic job in the queue to the added task;
distributing the tasks of the dynamic job to the plurality of workers in the distributed technical computing environment;
executing the tasks of the dynamic job on the plurality of workers; and
computing results of the executed tasks by the plurality of workers.

20. The system of claim 19 further comprising a plurality of workers for receiving distributed tasks from the scheduler and process the received tasks.

21. The system of claim 20 wherein the plurality of workers compute results of the processed tasks.

22. The system of claim 21 wherein the plurality of workers forward the results to the scheduler.

23. The system of claim 22 wherein the scheduler forwards the results to the client.

24. The system of claim 19 further comprising a data repository, having an interface in communication with the client and scheduler, for holding information associated with the one or more tasks of a dynamic job.

25. The system of claim 19, wherein the client and scheduler are on the same electronic device.

26. The system of claim 19, wherein the scheduler comprises an automatic task distributing mechanism and a job manager.

27. The system of 19, wherein the automatic task distributing mechanism and a job manager are on separate electronic devices.

28. In a client in a distributed technical computing environment, a method for the distribution of processing comprising:
creating tasks;
packaging the tasks into a dynamic job;
forwarding the dynamic job to a scheduler for distribution to a plurality of workers in the distributed technical computing environment, the scheduler:
placing the dynamic job in a queue for distribution,
assigning a priority to the dynamic job in the queue, and
adding a task from the client to the dynamic job with the scheduler, after the dynamic job has been forwarded to the scheduler, where the adding comprises:
applying the priority of the dynamic job in the queue to the added task; distributing the tasks of the dynamic job to the plurality of workers in the distributed technical computing environment;
executing the tasks of the dynamic job on the plurality of workers; and
computing results of the executed tasks by the plurality of workers.

29. In a scheduler in a distributed technical computing environment, a method for the distribution of processing comprising:
receiving a dynamic job comprising one or more tasks;
placing the received dynamic job in a queue for distribution;
assigning a priority to the received dynamic job in the queue;
receiving a task to be added to a received dynamic job;
adding the received task to the dynamic received job, where the adding comprises:

applying the priority of the received dynamic job in the queue to the added task; and distributing the one or more tasks of the dynamic job including the added task to a plurality of workers in the distributed technical computing environment;

executing the tasks of the dynamic job on the plurality of workers; and computing results of the executed tasks by the plurality of workers.

30. A computer-readable storage medium for use on a client in a distributed technical computing environment, the medium holding instructions executable using the client for distributing the processing of tasks in a distributed technical computing environment, the medium holding one or more instructions for:

creating tasks;

packaging the tasks into a dynamic job;

forwarding the dynamic job to the scheduler for distribution to a plurality of workers in the distributed technical computing environment, the scheduler:

placing the dynamic job in a queue for distribution, assigning a priority to the dynamic job in the queue, and adding a task from the client to the dynamic job with the scheduler, after the dynamic job has been forwarded to the scheduler, where the adding comprises:

applying the priority of the dynamic job in the queue to the added task;

distributing the tasks of the dynamic job to the plurality of workers in the distributed technical computing environment;

executing the tasks of the dynamic job on the plurality of workers; and computing results of the executed tasks by the plurality of workers.

31. A computer-readable storage medium for use on a scheduler in a distributed technical computing environment, the medium holding instructions executable using the scheduler for distributing the processing of tasks in a distributed technical computing environment, the medium holding one or more instructions for:

receiving a dynamic job comprising one or more tasks;

placing the received dynamic job in a queue for distribution;

assigning a priority to the received dynamic job in the queue;

receiving a task to be added to a received dynamic job;

adding the received task to the received dynamic job, where the adding comprises:

applying the priority of the received dynamic job in the queue to the added task;

distributing the one or more tasks of the dynamic job including the added task to a plurality of workers in the distributed technical computing environment;

executing the tasks of the dynamic job on the plurality of workers; and computing results of the executed tasks by the plurality of workers.

* * * * *